May 17, 1960  J. L. MYERS  2,936,868
TRANSMISSION CONTROL FOR MOTORCYCLES
Filed Sept. 8, 1959
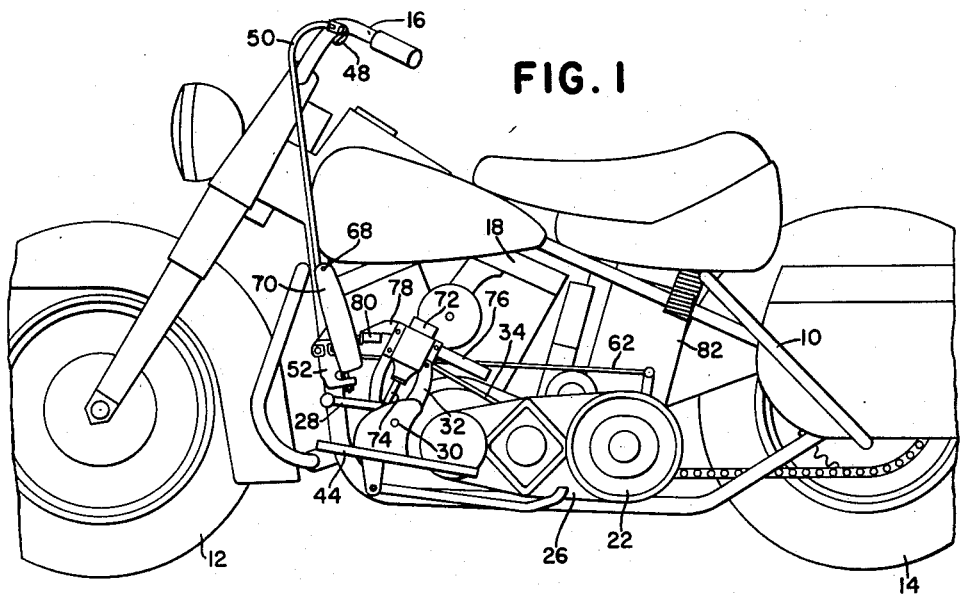
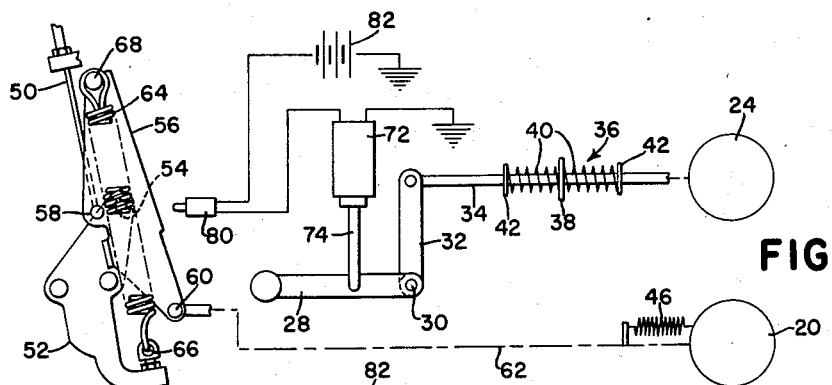
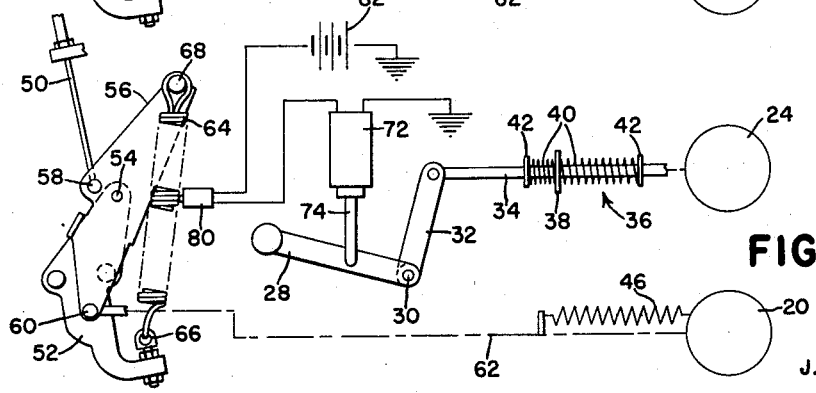
INVENTOR.
J. L. MYERS
BY
ATTORNEY

United States Patent Office 2,936,868
Patented May 17, 1960

2,936,868

TRANSMISSION CONTROL FOR MOTORCYCLES

John L. Myers, Davenport, Iowa

Application September 8, 1959, Serial No. 838,606

4 Claims. (Cl. 192—3.5)

This invention relates to improvements in motorcycles and more particularly to improved means for shifting the change-speed transmission responsive to disengagement of the motorcycle clutch.

In a typical model of motorcycle in which the present invention finds significant utility, the clutch is engaged and disengaged under control of a lever mounted on the handle bars, and speed changes in the transmission are effected by a lever in the form of a pedal mounted adjacent to a footboard at one side of the motorcycle. In shifting the transmission upwardly or, say, from first to second to third to fourth, the operator must hook his toe under the shift member and raise same to an amount sufficient to achieve the shift from, say, first to second. Prior to this, he must manually disengage the clutch. The transmission in this particular motorcycle is of the ratchet type in which the pedal, after being raised, is released so as to return to neutral. To make the next shift, the operator again raises the pedal by his toe, and so on until fourth speed is achieved, each speed change, being, of course, accompanied by a prior disengagement of the clutch, following reengagement of the clutch after the speed change has been effected. Down-shifting requires depression of the pedal, followed by release thereof so that the pedal returns to neutral. Here again, the clutch must be disengaged on each occasion.

The principal object of the present invention is to provide the improved gear shift control means which will eliminate the requirement that the gear shift pedal or lever be manually raised each time an up-shift is desired. It is a further object of the invention to coordinate the gear shifting means with the clutch control means so that the gear shift is automatically accomplished in response to disengagement of the clutch, at least in the up-shift range. It is a further object of the invention to provide the improved control means as a package assembly which may be readily applied to motorcycles of existing design and construction without extensive modification of the basic motorcycle design. Further objects reside in improved means for mounting the power-operated actuator; the use of an electrically energizable device as the actuator; a novel mounting for an electrical switch for energizing and deenergizing the actuator; and such other important objects and desirable features, inherent in and encompassed by the invention, as will appear from the ensuing disclosure of a preferred embodiment of the invention as outlined in the following specification and accompanying sheet of drawings, the several figures of which are described below.

Figure 1 is a perspective, with parts broken away, of a typical motorcycle, illustrating the application of the invention thereto.

Figure 2 is an enlarged view, largely schematic, showing the clutch and transmission control with the clutch engaged and the gear shift member in a neutral position.

Figure 3 is a similar view, showing what occurs in the mechanism when the clutch is disengaged, followed by shifting of the transmission to a next higher ratio.

The basic motorcycle chosen for purposes of illustration is representative of a currently popular make, in this case a Harley-Davidson. This motorcycle, as is typical, has a main frame 10 carried on front and rear wheels 12 and 14 and guided by handle bars 16. The power train for the motorcycle includes a typical internal combustion engine 18, a change-speed transmission and a clutch. Since the transmission is of conventional design and the details thereof are familiar to those versed in the art, the same is shown only schematically at 20 in Figures 2 and 3, and is normally contained in a clutch housing such as shown at 22 in Figure 1. For the same reason, the transmission is indicated schematically at 24 in Figures 2 and 3 and may be regarded as contained in part in housing means 26 (Figure 1). The transmission, as is typical in motorcycles of the model referred to above, is of the type in which a shift member 28, which may be regarded as a pedal, is pivotally mounted on the frame at 30 and is in the form of a bell crank having a lever arm 32 connected by linkage 34 to the transmission 24. The transmission contains pawl and ratchet mechanism (not shown) which operates, through movement of the pedal 28 through a certain range, to shift the transmission upwardly or downwardly; that is, in increasing ratio or in decreasing ratio. The range of movement of the member 28 in the up-shifting phase is illustrated in Figures 2 and 3. In Figure 2, the lever or member 28 is in what may be regarded as a neutral position. When the member 28 is moved upwardly to the position shown in Figure 3, a gear change is effected. The transmission or the linkage therefor, illustrated at 34 here, is automatically returned to its neutral position (Figure 2) by centering spring means, illustrated here schematically at 36. The details of the centering spring means are not important, since the fundamentals of the transmission are well understood by those versed in the art. For present purposes, the centering means includes a frame-mounted portion 38 opposed at opposite sides by a pair of springs 40 which act against stops 42 carried by the link 34. Down-shifting of the transmission is accomplished by depressing the pedal 28 below the position shown in Figure 2. In either case, the centering means 36 results in returning the pedal 28 to its Figure 2 position when the operator releases pressure thereon. The operator normally carries his foot on a footboard 44 proximate to the pedal or member 28.

The clutch 20 is normally biased to engage position and for this purpose there has been illustrated schematically at 46 a spring representative of this structure and function. In the usual case, the springs for the clutch would be contained within the clutch housing, but here again this is a detail that warrants schematic illustration, since the basic construction is known to those versed in the art.

The clutch operating means includes a pivoted hand lever 48 mounted on the handle bars 16, preferably at the left side thereof. This lever is connected by a push-pull cable means 50 which comprises part of linkage connected between the lever 48 and the clutch 20. The frame 10 includes as a part thereof a mounting bracket 52 which provides a fulcrum 54 on which is mounted a movable part, here in the form of a bell crank 56 having one arm thereof, as at 58, connected to the cable 50, and having another arm thereof, as at 60, connected to a link 62 which in turn is connected to the clutch 20. An assist spring 64 is anchored at one end at 66, to a depending portion of the bracket 52, and is connected at its other end at 68 to another arm portion of the bell crank 56. When the clutch is engaged, as illustrated in Figure 2, the line of force exerted by the spring 64 is over-center as respects the three points 66, 54 and 68.

When the lever 48 on the handle bars 16 is squeezed, the cable 50 exerts a force, rocking the bell crank about its pivot 54 so that the spring 64 moves rearwardly to the opposite side of the over-center position, and the spring 64 thus acts to overcome the clutch spring 46, whereby to effect disengagement of the clutch. When the operator releases pressure on the lever 48, the spring arrangement is such that the clutch reengages and the bell crank 56 returns from the Figure 3 position to the Figure 2 position. This is conventional construction and operation. As shown in Figure 1, the bell crank 56 and spring 64 are normally enclosed by a cover 70, but in Figure 1 the basic connections will be understood on the basis of the portion of the bracket 52 and the connection at 68.

In a motorcycle not equipped with the present invention, operation of the transmission in the up-shifting phase includes, first, disengagement of the clutch by the means 48—56—62, followed by lifting of the member 28 from the Figure 2 position to the Figure 3 position. After the gear change has been effected, the operator removes his foot from below the lever 28, and the centering means 36 returns the lever 28 to its Figure 2 position, leaving the transmission in the selected speed ratio, and the operator releases the lever 48 and the clutch reengages. It will thus be seen that up-shifting requires the coordinated effort of one hand and one foot.

According to the present invention, the manual effort is reduced by the automatic mechanism for accomplishing gear shifting in response to disengagement of the clutch. For this purpose, the invention includes a power-operated actuator, here an electrically energizable device in the form of a solenoid 72 having its armature 74 connected to the shift member 28. The body of the solenoid 72 is mounted on the motorcycle frame, preferably through the medium of a bracket 76 mounted on any suitable available mounting studs, such as those that are convenient to the power plant 18. The bracket includes a forwardly projecting portion 78 which carries an operator, here an electrical switch 80, connected in circuit with the solenoid 72 and a frame-mounted battery 82. The battery, of course, is furnished as part of the motorcycle for operating lights, signals, etc., and consequently is conveniently available for powering the solenoid 72. The electrical circuit is illustrated schematically but is fundamental and need not be elaborated.

As best shown in Figures 2 and 3, the switch 80 is located in the path of movement of the assist spring 64 as that spring, regarded as a control part, moves from the Figure 2 position to the Figure 3 position. In other words, the spring 64 in Figure 2, when the clutch 20 is engaged, is spaced ahead of the switch 80 and therefore the switch is normally open so that the solenoid 72 is deenergized. When the bell crank 56 and spring 64 move to the Figure 3 position, following pressure on the hand lever 48, the spring 64 engages the switch 80 to close same and thereby to complete the circuit to the solenoid 72, the armature 74 of which is drawn upwardly so as to rock the shift member 28 from the position of Figure 2 to the position of Figure 3, thereby effecting an up-shift in the transmission 24. The arrangement is such that as the spring 64 approaches its Figure 3 position, the clutch is already disengaged, and the final part of movement of the spring 64 to the Figure 3 position subsequently closes the switch 80, so that disengagement of the clutch and an up-shift in the transmission occur in proper sequence. When the operator relaxes pressure on the hand lever 48 for the purpose of incurring reengagement of the clutch, the parts of course return to the respective positions shown in Figure 2, and the previously closed switch 80 is opened, breaking the electrical circuit to the solenoid 72, whereupon the centering and return springs take over to reengage the clutch and to return the shift member 28 to its Figure 2 position, leaving the transmission in the speed ratio just selected. Subsequent up-shifts are achieved in the same manner.

In down-shifting, the operator manually depresses the lever 28, which overcomes the action of the solenoid 72. In other words, down-shifting is accomplished in the same fashion as it is conventionally accomplished in a motorcycle not equipped with the present invention.

It will be seen from the foregoing that the invention provides an automatic operator for the change-speed transmission in easily and automatically accomplishing up-shifts, all responsive to disengagement of the clutch by the normal hand lever 48. The sequential arrangement is such that disengagement of the clutch occurs properly in timed relationship to or followed by up-shifting in the transmission. The mechanism is simple, may be inexpensively constructed and marketed and may be readily mounted on the motorcycle. Since it is relatively simple and comprises but a few moving parts, maintenance and operation is economical and free from difficulty beyond ordinary maintenance and care. Features and advantages other than those categorically enumerated will readily occur to those versed in the art, as will many modifications and alterations in the preferred embodiment disclosed, all of which may be achieved without departure from the spirit and scope of the invention.

What is claimed is:

1. Gear shifting means for a motorcycle having a frame including handle bars, a power train including a clutch biased to engaged condition and a change-speed transmission, clutch-operating means including a lever on the handle bars and linkage between said lever and the clutch and having a frame-mounted bell crank swingable between first and second positions respectively according to engagement and disengagement of the clutch and an assist spring acting on and shifting with said part, and a frame-mounted gear shifter biased to a neutral position and movable to a shift position and back to said neutral position, comprising: a power-operated actuator anchored on the frame and connected to the gear shifter and energizable and deenergizable to respectively incur the neutral and shift positions of said shifter; an operator for energizing and deenergizing the actuator and mounted on the frame in the path of movement of the assist spring when said spring moves said said bell crank from the first position to the second position of the latter whereby, upon actuation of the hand lever to move the bell crank to its second position, the assist spring engages the operator to energize the actuator so as to shift the gear shifter.

2. The invention defined in claim 1, in which: the actuator is an electrically energizable device, normally deenergized, and the operator is a normally open electrical switch closable by movement of the assist spring as aforesaid.

3. Gear shifting means for a motorcycle having a frame including handle bars, a power train including a clutch biased to engaged condition and a change-speed transmission, clutch-operating means including a lever on the handle bars and linkage between said lever and the clutch and having a frame-mounted part movable between first and second positions respectively according to engagement and disengagement of the clutch, and a frame-mounted gear shifter biased to a neutral position and movable to a shift position and back to said neutral position, comprising: a power-operated actuator anchored on the frame and connected to the gear shifter and energizable and deenergizable to respectively incur the neutral and shift positions of said shifter; an operator for energizing and deenergizing the actuator and mounted on the frame in the path of movement of the aforesaid part when said part moves from its first position to its second position whereby upon actuation of the hand lever to move the part to its second position, the part engages the operator to energize the actuator so as to shift the gear shifter.

4. The invention defined in claim 3, including: a frame-mounted bracket carrying both the actuator and the operator.

References Cited in the file of this patent

UNITED STATES PATENTS

| | | |
|---|---|---|
| 1,313,362 | Wiegand | Aug. 19, 1919 |
| 2,035,678 | Swift | Mar. 31, 1936 |
| 2,071,538 | Kelley | Feb. 23, 1937 |
| 2,110,994 | Linsley | Mar. 15, 1938 |
| 2,195,365 | Getaz | Mar. 26, 1940 |
| 2,617,505 | Tatge | Nov. 11, 1952 |